July 12, 1955
L. H. BARRON
2,712,715
TREE COVER OR TENT
Filed March 20, 1952
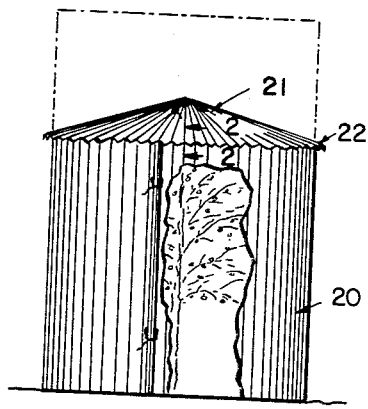
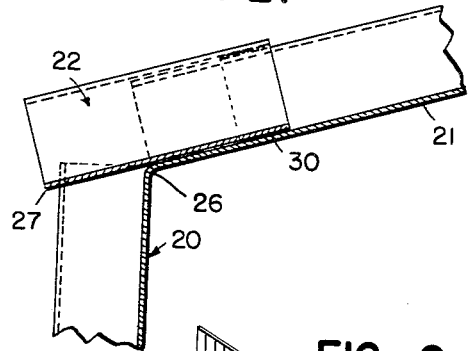
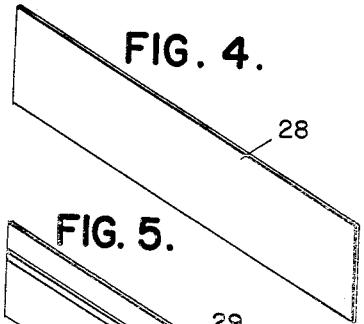
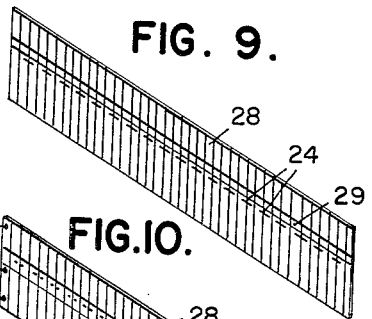
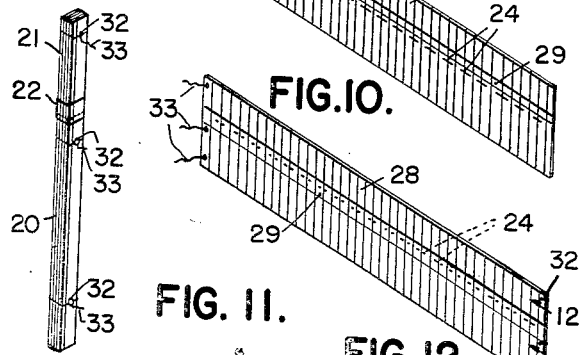
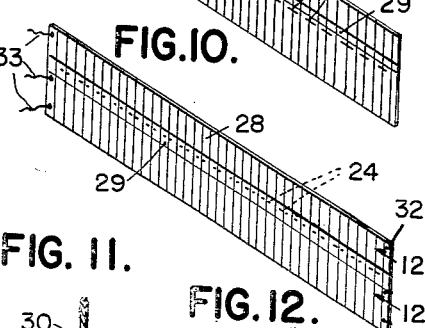
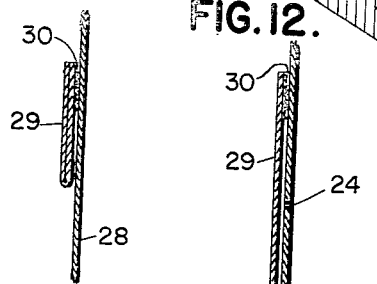
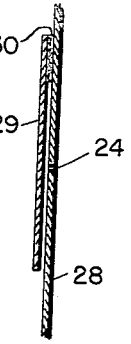
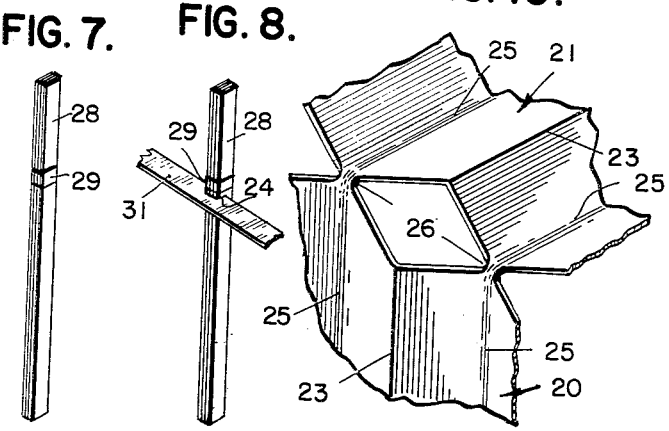
INVENTOR
LEE H. BARRON
BY
ATTORNEY 2,712,715

TREE COVER OR TENT

Lee H. Barron, Glendale, Calif.

Application March 20, 1952, Serial No. 277,679

7 Claims. (Cl. 47—21)

This invention relates to a tree cover or tent for protecting fruit trees and the like from damage due to frost or other deleterious weather conditions.

The principal object of the invention is to provide an inexpensive cover or tent for fruit trees which may be quickly and easily installed around the tree in time of need. Another object is to provide a cover or tent for trees which can be folded into a compact package for storage when not in use. Another object is to provide a fruit tree tent or cover which in association with the tree itself is self-supporting. Still another object is to provide a self-adjusting tree cover or tent.

These and other objects are attained by my invention which will be understood from the following description, reference being made to the accompanying drawing, in which Fig. 1 is a side elevational view of the tree cover in position enclosing a tree, the broken lines showing the roof portion before it assumes its top closing position over the tree;

Fig. 2 is a fragmentary cross-sectional view taken on the line 2—2 of Fig. 1;

Fig. 3 is a perspective view showing the tree cover in folded position ready for storage;

Fig. 4 is a perspective view of a large paper blank which is used for forming the tree cover;

Fig. 5 is a perspective view of the blank shown in Fig. 4 including the folded-over eaves forming portion attached above the roof line;

Fig. 6 is a perspective view showing the blank of Fig. 5 after it has been accordion pleated;

Fig. 7 is a perspective view of the same, completely collapsed or compactly folded;

Fig. 8 is a perspective view showing the method of partly slitting the pleats at the roof line;

Fig. 9 is a perspective view showing the fully expanded pleated sheet with the interrupted slits as produced by the operation illustrated in Fig. 8;

Fig. 10 is a perspective view showing the fully expanded pleated sheet with the eaves portion folded to open position and covering the interrupted slits, and also showing the fastening means on the ends of the sheets.

Fig. 11 is a cross-sectional view taken on the line 11—11 of Fig. 5 showing the adhesive joint between the eaves portion and the roof portion;

Fig. 12 is a cross-sectional view taken on the line 12—12 of Fig. 10 showing the eaves portion folded to open position and covering the slits; and Fig. 13 is a perspective view showing how the unslitted portions of the folds act as hinges for the roof portion, the eaves being omitted for clarity.

Referring to the drawings, my tree cover or tent consists of vertically disposed side walls 20, a conical roof portion 21 and an eaves portion 22. The side walls, roof portion and eaves portion are made of stiff paper or paperlike material which is sufficiently water-proof to withstand the ordinary use of the tent in the field. The paper material of which the tree cover or tent is constructed, is formed into accordion pleats arranged vertically in relation to the position of the tent as used, and the paper material is sufficiently pliable so that it does not break at the folds and yet is rigid or stiff enough so that the tent is self-supporting and will remain erect when resting upon the ends of the accordion pleats. The roof portion 21 is formed with pleats continuous with the side wall pleats, and the eaves portion 22 which is attached to the roof portion 21, extends out over the joint between the side walls 20 and the roof portion 21. The outer folds 23 of the accordion pleat are cut in horizontal slits 24 partly through the width of the folds, the uncut inside folds 25 forming connecting tabs 26 which serve as hinges to permanently hold the roof portion 21 to the side walls 20. The openings formed at the slits when the roof portion is folded inwardly are covered by overhanging pleated eaves 27 which are formed by the eaves strip 22, which is attached to the roof portion.

The tent or cover of this invention may be readily manufactured by the method illustrated particularly in Figs. 4 to 12. A large paper blank 28 of sufficient length to encircle a tree at its maximum girth and preferably somewhat longer than the maximum girth, is provided at the roof line with an eaves strip 29 of similar paper material folded upon itself longitudinally, as shown particularly in Fig. 11. The eaves strip 29 is attached on the portion which will constitute the roof portion 21 of the tent by an adhesive material 30. The paper blank 28 with the folded eaves strip attached (Fig. 5) is then formed by a well known method into vertically disposed accordion pleats (Fig. 6), which in the completely collapsed form is shown in Fig. 7. The pleat's edges on one side of the collapsed pleated sheet are partially severed by means of a knife 31, at the elevation corresponding to the roof line slightly below the lower edge of the folded eaves strip 29 (Fig. 8). The sheet of paper with the interrupted slits 24 is then fully expanded (Fig. 9), and the folded eaves strip 29 is opened to the position shown in Figs. 10 and 12, the unattached part of the eaves strip then covering the slits 24. Fastening means are then attached at the end edges, those shown in the drawings, consisting of friction disk fasteners 32 on one end, and tieing cords 33 at the opposite end, in corresponding spaced apart positions. The tent or cover may then be collapsed and tied into a compact bundle, as shown particularly in Fig. 3, and in this form may be stored when not in use in the field.

Other methods of producing the tent structure may involve the slitting of the outside folds of the folded blank prior to the attachment of the eaves strip 29, this strip being then adhesively attached to the slitted and pleated blank, thus avoiding the folding of the eaves strip, as described above.

Where the terms paper or paper material are used in this specification and in the claims, it is intended to include all paperlike materials which have these suitable properties for use in making my device as explained above. A laminated paper structure known in the trade as "sisalcraft" has been found to be satisfactory because of its rigidity when folded in accordion pleats, because of its weather resisting qualities, and its resistance to tearing. Other paper products such as aluminum foil coated paper, or flexible plastic laminates having the desired stiffness and rigidity when folded, may be used, and are included in the term paper as used herein.

The advantages of my tree tent or cover will be apparent. It may be made from relatively inexpensive materials and when formed into accordion pleats, as described, the side walls have sufficient rigidity to maintain the cover in position irrespective of wind. The roof portion being hingedly attached to the side walls maintains itself in position resting on the top branches of the tree. The advantages of collapsibility to a compact package for storage has been previously mentioned and the ease of manufacture and the consequent low cost of the tent or cover has also been described above.

The tent is also easily applied to a tree by unskilled workmen who merely encircle the tree with the side walls and the eaves portion disposed vertically, as indicated in Fig. 1. When the adjoining edges of the side walls have been fastened together by the fastening means 32 and 33 to form a substantially cylindrical body, the conical roof portion may be collapsed over the top of the tree by merely pressing that portion of the cover inwardly, the weight of the cover maintaining it in place and the rigidity brought about by the folds in the roof portion providing the requisite amount of bracing of the side walls to hold the tent in erect form. The large area of the ground under the tree which is enclosed with the cover assists in maintaining the atmosphere within the tent above the freezing or frosting point because of the warming radiations from the earth. If desired, a small oil stove may be operated inside the tent.

I claim:

1. A tree tent or cover comprising a sheet of stiff weatherproof paper, said sheet of paper being accordion pleated in vertical pleats and said pleats having sufficient stiffness to remain erect when the ends of said pleats are resting upon the ground, said pleated paper sheet being adapted for encircling a tree, and means for removably fastening together the vertical end edges of said pleated paper sheet, the outward folds of said pleats having horizontal slits extending partly through said outward folds whereby the portion of the sheet above said slits may be folded inwardly to form a cone-shaped self supporting roof over said tree.

2. A tree tent or cover comprising a sheet of stiff weatherproof paper, said sheet of paper being accordion pleated in vertical pleats and said pleats having sufficient stiffness to remain erect when the ends of said pleats are resting upon the ground, said pleated paper being adapted for encircling a tree, means for removably fastening together the vertical end edges of said pleated paper sheet, the outward folds of said pleats having horizontal slits extending partly through said outward folds whereby the portion of the sheet above said slits may be folded inwardly to form a cone-shaped roof over said tree, and means for covering the openings at said slits when said sheet of paper is circled around said tree, and said roof has been formed by the portion of said sheet above said slits.

3. A tree tent or cover comprising a sheet of stiff weatherproof paper, said sheet of paper being accordion pleated in vertical pleats and said pelats having sufficient stiffness to remain erect when the ends of said pleats are resting upon the ground, said pleated paper being adapted for encircling a tree, means for removably fastening together the vertical end edges of said pleated paper sheet, the outward folds of said pleats having horizontal slits extending partly through said outward folds whereby the portion of the sheet above said slits may be folded inwardly to form a cone-shaped roof over said tree, and a strip of weatherproof paper attached to said sheet above said slits and covering said slits, said strip of paper being also formed in coinciding accordion pleats, whereby said slits are covered by eaves when the portion of said pleated sheet above said cut is folded inwardly to provide a top cover for said tree.

4. A tree tent or cover comprising a sheet of stiff weather-proof paper of length greater than the height of the tree to be covered and of breadth greater than the maximum girth of said tree, said sheet of paper being accordion pleated in vertical pleats and said pleats having sufficient stiffness to remain erect when the ends of said pleats are resting upon the ground; and means for removably fastening together the vertical end edges of said pleated sheet of paper after forming a pleated cylindrical enclosure for a tree with the lower ends of the pleats resting on the ground; the outward folds of said pleats being provided with slits cut horizontally partly through said outward folds, said slits being above the elevation of the maximum girth of said tree; the portion of the pleated sheet of paper above said slits being bendable inwardly to form the roof for said tent or cover.

5. A tree tent or cover comprising a sheet of stiff weather-proof paper of length greater than the height of the tree to be covered and of breadth greater than the maximum girth of said tree, said sheet of paper being accordion pleated in vertical pleats and said pleats having sufficient stiffness to remain erect when the ends of said pleats are resting upon the ground; and means for removably fastening together the vertical end edges of said pleated sheet of paper after forming a pleated cylindrical enclosure for a tree with the lower ends of the pleats resting on the ground; the outward folds of said pleats being provided with slits cut horizontally partly through said outward folds, said slits being above the elevation of the maximum girth of said tree; the portion of the pleated sheet of paper above said slits being bendable inwardly to form the roof for said tent or cover, and a strip of weather-proof paper attached to said sheet above said slits and covering said slits, said strip of paper being also formed in coinciding accordion pleats, whereby said slits are covered by overhanging eaves.

6. The method of forming an expandable package which when opened is adapted to form a stiff paper tent having vertical accordion pleated sides and a pleated conical roof, comprising the steps of attaching a narrow strip of longitudinally folded stiff paper to a large sheet of stiff paper at a position above the roof line, said sheet of paper being of sufficient length to form the side wall and the roof of said tent, and said strip being of sufficient width to overlap said roof line; folding said sheet and attached folded strip to form accordion pleats; completely collapsing said pleated sheet into a tight package; partly severing the folds from one side of said package; fully expanding said pleats; unfolding said strip to cover said partly severed edges; and collapsing said pleated sheet and pleated strip into a compact package.

7. The method of forming a stiff paper tent having vertical accordion pleated sides and pleated conical roof, comprising the steps of folding a sheet of stiff paper into an accordion pleated package, said paper being of width to form the side wall and the roof of said tent; partly severing the edges of the pleats on one side to form bendable connecting tabs at the inner edge of each fold between the side-wall and roof; attaching a parallel pleated strip of stiff paper to said roof, bending the roof portion at an angle to the wall portion, then forming the cylindrical side wall and roof, and joining the mating ends thereof, the said unattached portion of said pleated strip extending over said severed edges.

References Cited in the file of this patent

UNITED STATES PATENTS

| 677,094   | McFarland     | June 25, 1901  |
| 1,701,797 | Schindler     | Feb. 12, 1929  |
| 1,805,212 | Graffenberger | May 12, 1931   |
| 1,834,084 | Barnes        | Dec. 1, 1931   |
| 1,926,053 | Morgan        | Sept. 12, 1933 |
| 2,117,240 | Cohon         | May 10, 1938   |

FOREIGN PATENTS

| 799,115 | France | Mar. 27, 1936 |